Patented Dec. 27, 1949

2,492,650

UNITED STATES PATENT OFFICE 2,492,650

DOUBLE FLUORIDE OF SODIUM AND ALUMINUM AND PRODUCTION THEREOF

Daniel C. McLean, St. Louis, Mo., John E. Morrow, East St. Louis, Ill., and Jacob R. Fox, St. Louis, Mo., assignors to Aluminum Company of America, Pittsburgh, Pa., a corporation of Pennsylvania No Drawing. Application September 8, 1944, Serial No. 553,284

10 Claims. (Cl. 23—88)

This invention relates to the production of double fluorides of sodium and aluminum, and particularly to the production of sodium aluminum fluoride having improved properties for use as an insecticide. Double fluorides of sodium aluminum occur naturally as the minerals cryolite ($Na_3AlF_6$) and chiolite, which has a reported formula of $5NaF.3AlF_3$. The ratio of sodium fluoride to aluminum fluoride in the synthetic compound, which is the subject of this invention, approximates that of cryolite, but under conditions of production may contain those fluorides in somewhat different ratios. Consequently, although the compound may be called synthetic or artificial cryolite, it is herein described by the general term "sodium aluminum fluoride," which term includes all impurities which may be associated with the compound.

One of the principal uses of double fluorides of sodium and aluminum, such as the natural or the synthetic cryolite, has been that of insecticidal powder, and the usefulness of such compounds as stomach and contact poisons for various insects has been well established. When used as insecticide, the double fluoride of sodium and aluminum must be in a form which promotes toxicity and, in addition, must have physical properties adapted to their aplication, in the form of a powder, to plants, fruit, foliage, and other growing things. Morrow has pointed out in his U. S. Patent No. 2,210,594 (patented August 6, 1940) that one physical property of primary importance is proper density, if the powdered double aluminum fluoride is to serve satisfactorily as either a spraying or dusting insecticide. The Morrow patent also explains that the property of adherence to the foliage or plant to which the powder is to be applied is also of importance. These and other properties are governing factors in the preparation of a suitable double sodium aluminum fluoride to be used as a dusting insecticide. However, even when all of these properties are attained, utilization of the sodium aluminum fluoride as a dusting insecticide may be limited by poor dusting qualities. The powdered insecticides are often, as is well known, applied by dusting methods in which the dry powder is "blown" or otherwise released into the atmosphere over the area of plants or foliage to be treated and allowed to settle thereon. In order to facilitate this dusting operation, the powder should have the property of free flow and be non-pelleting, i. e., the particles of the powder should not ball up or stick to each other when ejected from the dusting apparatus, but should readily disperse as a cloud of individual particles. Moreover, the powder should have a high settling velocity after release to the atmosphere so that the dust cloud thus formed settles quickly on and around the plants, thus preventing air currents from removing substantial quantities of the dust from the area under treatment. Yet, this settling action should be such that the powder remains in suspension long enough in the atmosphere to insure that the lower, as well as the upper, sides of the plants and foliage will be covered by the insecticide. It is one of the objects of this invention to provide a sodium aluminum fluoride product which possesses all of these properties in high degree, but particularly possesses properties of free flow and dustibility beyond those of unconditioned sodium aluminum fluoride powders which have been previously provided. By "unconditioned powders" we mean those which have not been treated with soaps or mineral or vegetable oils to promote their flow or their adherence or other properties. The addition of such diluents not only induces the property of non-wettability, which renders the material unfit for use in spray mixtures, but is expensive. However, even when such diluents are used, the combination of free flowing and dusting properties achieved in the product of this invention are not obtained.

The new product of this invention consists of a sodium aluminum fluoride precipitated form, the particle size of which is so controlled that over 90 per cent., and preferably over 95 per cent., thereof is not greater than 10 microns in size and the average particle size is between 2.5 and 5.0 microns, and preferably about 3.5 microns. We have discovered that in so far as free flow, non-pelleting and dustibility are concerned, while proper density is useful, the critical factor is particle size, and that there is but a narrow range of average particle size in which the sodium aluminum fluoride exhibits these properties to the highest degree and still remains within the maximum toxicity limits of 0 to 5 microns. Optimum conditions are not attained unless at least 90 per cent. of the particles are about 10 microns, or under, in size or, in other words, the mixing of a coarse powder with a powder of very minute size, such as 1 or 2 microns, may produce an average particle size between 2.5 and 5.0 microns, without producing in high degree the proper flow and dusting characteristics. Thus the average particle size must not only be within the range indicated, but there should be a minimum of larger and smaller particles. In other words, the product must be uniformly sized.

A further object of the present invention is the provision of methods which may be used to manufacture this new product. It has not been found possible to make this product by mixing coarse, free-flowing powders with fine, non-flowing powders since the poor dusting properties of the fine material always predominate. Hence, the only practical method of producing the aforedescribed dusting fluoride is by controlled precipitation from a solution. The novel methods about to be described are those devised by us for the production of a sodium aluminum fluoride powder insecticide having the critical particle size and distribution above mentioned, but these methods may likewise be used for broader purposes, since by their use, as will hereinafter be described, the size of particles precipitated may be controlled over a range substantially greater than that which is found useful in the production of our new and novel insecticide product. These methods, while specifically different in manipulation and in consistency of result, may be generically described as a method of producing sodium aluminum fluoride having particles 90 per cent. of which are of the size of 10 microns or less and having an average particle size of 2.5 to 5.0 microns, which comprises neutralizing a sodium aluminum fluoride solution in the presence of seed particles of a size of 1 to 2 microns, the ratio of the weight of said seed to the weight of soluble fluorine ($F_2$) in the solution being between about 0.45 and 0.87.

The preferred method of controlled precipitation is one by which the product of this invention can, if desired, be consistently produced. In this process we start with a solution of cryolite and dilute caustic soda or with a solution of sodium aluminum fluoride. In any event, the solution contains sodium, aluminum, and fluorine and dilute caustic alkali. In this solution the content of the aluminum, calculated as alumina, should be the theoretical equivalent of that amount necessary to form with the fluorine content of the solution the compound $Na_3AlF_6$. An excess of alumina may be used, a limiting factor being the purity of the final product, since the excess precipitates as aluminum hydrate and consequently acts as a diluent. Preferably, when an insecticidal sodium aluminum fluoride is being prepared, the excess should be limited, as trial may indicate, to allow production of a product containing 85 per cent. by weight, or more, of sodium aluminum fluoride. To this solution we then add a predetermined quantity of sodium aluminum fluoride particles of predetermined size, and after thoroughly agitating the mixture of the solution and these particles to insure uniform distribution of the particles therein, we neutralize the mixture as quickly as possible. The neutralizing agent may be any compound which will neutralize the caustic solution and start the precipitation of the double fluoride of sodium and aluminum therefrom, such as, for example, a mineral acid, sulfur dioxide, a soluble bicarbonate or carbon dioxide. During this neutralization step the temperature of the solution should be maintained at about 60° to 140° F., the upper portion of the temperature range being used if it is desired to precipitate a product with a minimum content of aluminum hydrate, i. e., about 6 per cent. or less.

To produce a precipitate of a particular average particle size in the operation of this process, the ratio of the amount of solid sodium aluminum fluoride particles added to the starting solution is adjusted with reference to the soluble fluorine content of the solution and, in addition, the average size of the added particles is carefully controlled. To produce the preferred product of this invention, i. e., a sodium aluminum fluoride having particles 90 per cent. of which are a size of 10 microns or less and having an average particle size of 2.5 to 5.0 microns, the solid sodium aluminum fluoride, usually in the form of a slurry containing about 15 per cent. by weight of suspended solids, should be added to the solution in the form of particles having an average size of 1 to 2 microns, and the ratio of weight of the seed to the soluble $F_2$ in the solution should be between 0.45 and 0.87. The particular ratio desirable depends for the most part on the size of the seed particles and the particular size of product sought. Thus, if the seed is of a size of 1 micron and the average size of particle ultimately desired is 2.5 microns, the ratio of weight of seed to weight of soluble $F_2$ in the solution will be about 0.80. Other factors being the same, an increase in the size of the seed to 2 microns will necessitate a change of the ratio from 0.8 to 0.87 in order to produce the same average particle size. If an average particle size of 5 microns is desired, the use of a seed size of 1 micron will require a ratio of weight of seed to weight of soluble $F_2$ of 0.45, and if the starting size of the seed is 2 microns, the ratio must be changed to about 0.56 to maintain the average size of the particles produced at 5 microns.

Thus, if the average size of the seed employed is 1.5 microns, and a final product having an average diameter of 2.7 to 3.7 microns is desired, a ratio of weight of seed to weight of soluble $F_2$ of 0.675 is needed. On the other hand, if the seed is 1 micron in size, the ratio of weight of seed to weight of soluble $F_2$ should be changed to about 0.6 to produce a final product of the size mentioned, whereas with seed 2 microns in size the ratio needed for producing the same product is about 0.75. When such conditions are followed the precipitate contains sodium aluminum fluoride of the particle size desired, and the new product will be consistently produced. However, in the preferred use of this process to produce the product of this invention, the average particle size of the solid sodium aluminum fluoride added to the starting solution is maintained at about 1 to 2 microns, and the particles are added in the ratio of roughly 0.675 pound of particles to each pound of soluble fluorine in the solution.

A further variation of this process of our invention will, we have discovered, tend to increase the positive control of the quality of the precipitate of sodium aluminum fluoride. This modification consists in first providing a solution containing the soluble fluorine, i. e., a solution containing sodium and fluorine, then adding the amount of solid sodium aluminum fluoride particles desired, and then completing the preparation of this starting solution by adding the required amount of caustic and aluminum compound, i. e., a solution containing sodium and aluminum in alkaline form to adjust the aluminum content of the solution to the finally desired content. Thereafter the neutralization and precipitation of the solution proceed as described.

The use of the above described process need not, however, be confined to the production of the particular products of this invention, but may be used to produce controlled precipitates of other sizes. For instance, if it is desired to produce a sodium aluminum fluoride product, 90 per cent. of the particles of which are 5 microns or less in size, this can be achieved by doubling approximately the quantity of sodium aluminum fluoride seed particles added to the starting solution. Likewise, the sodium aluminum fluoride produced may be controlled so that 90 per cent. of its particles are greater than 10 microns by adding to the starting solution, in the ratio of about 0.675 pound per pound of soluble fluorine, solid particles of sodium aluminum fluoride having an average size of 8 microns or larger.

As an example of the operation of the practical form of process under plant conditions, we will cite an instance of production of the product of this invention. 3200 cubic feet of solution containing 11 grams per liter of soluble $F_2$ and 3 grams per liter of $Al_2O_3$ were pumped into a tank which was so constructed that carbon dioxide gas could be fed therein. To this solution was then added 1500 pounds of solid sodium aluminum fluoride particles having an average particle size of 1.5 microns. Next there was added to the solution an amount of sodium aluminate liquor, such as that produced in the Bayer process, as would adjust the $Al_2O_3$ content of the total solution to 4.9 grams per liter. The total mixture was then thoroughly agitated for 30 minutes with air to achieve complete mixture of the components, and meanwhile the temperature of the solution was adjusted to 100° F. Thereafter a stream of carbon dioxide gas was forced through the solution and gassing was continued until at least 50 per cent. of the sodium hydroxide and sodium carbonate present in solution had been converted to sodium bicarbonate. The precipitate obtained was then separated from the solution by passing it through a filter press, the precipitate dried and, because it was in an agglomerated state, the agglomerates were broken down to their ultimate size in a disintegrator consisting of two sets of circularly arranged spokes revolving in opposite directions. Upon measuring, the particles of the product were found to be distributed according to the following sizes:

|  | Per cent |
|---|---|
| 0 to 5 microns | 43.04 |
| 5 to 10 microns | 53.78 |
| 10 to 20 microns | 2.46 |
| 20 to 40 microns | 0.40 |
| Plus 40 microns | 0.32 | and had an average particle size of 2.70 microns.

The sodium aluminum fluoride particles which are added to the starting solution in the above described process may be made in the size desired by any convenient method. For instance, they might be reduced from larger particles by grinding, or they may be the result of selection, by an air elutriation method or other method, of a fraction of the precipitate produced by the operation of the process. We have found it convenient, when an average particle size of 1 to 2 microns is required, to produce these particles by treating a sodium aluminate solution with hydrofluoric acid gas but the method of reducing the sodium aluminum fluoride particles to proper size forms no part of this invention.

The second and different method of precipitation which will produce the product of this invention will now be described. This process, however useful it may be for the precipitation of an ordinary quality of sodium aluminum fluoride for insecticidal or other purposes, such as, for instance, those insecticide powders which are applied to plants or foliage in suspension in a liquid or by means other than dusting, is not the preferred method of producing the specific dusting powder herein described, because it is not as susceptible to close control of size of the precipitate produced as is the preferred and first described process.

This second process comprises the use of a starting solution of an acid such as mineral acid, acid carbonate or the like, which will neutralize an alkaline solution containing sodium, aluminum, and fluorine to precipitate therefrom the sodium aluminum fluoride. This solution is usually contained in some suitable receptacle such as a tank. Prior to use in the process, it is adjusted to a temperature of at least 60° F. and usually to temperatures in the range of 80° to 100° F. Higher temperatures may be used but are not usually necessary. Another solution such as described in connection with the first method and containing aluminum, fluorine, sodium, and dilute caustic alkali, which latter, of course, may desirably be sodium hydroxide, is then added to the starting solution and while this addition takes place more acid or acid-forming material is added to the starting solution, the acid in the starting solution and the added acid or acid-forming substance being adjusted in amount to neutralize about 20 per cent. of the total incoming caustic solution of sodium, aluminum and fluorine. The resultant initial precipitate is finely divided sodium fluoride of about 1.5 micron size. During subsequent further neutralization of sodium aluminum fluoride solution this precipitate then functions in the same manner as the solid particles which were added from an outside source as described previously under the first process, sufficient solution containing sodium, aluminum, fluorine, and caustic alkali being employed to provide the ratios of weight of the precipitate formed as described above to soluble fluorine as are set forth in connection with the first method described.

We have found that this process can be operated to produce our new and improved product, i. e., a sodium aluminum fluoride powder having particles 90 per cent. of which are not more than 10 microns in size and which have an average size of 2.5 to 5.0 microns, but in commercial production this process is sensitive and the new product is not always produced. In the manipulation of this second process to this end, the starting solution is composed of a solution of sodium bicarbonate containing that substance in amounts of at least 30 grams per liter. As will be later explained, this solution can be conveniently obtained as a by-product of the operation of the process. The solution is placed in a receptacle, usually a tank, which is provided with means for delivering carbon dioxide gas to the solution. The temperature of the solution is maintained throughout the process at the temperatures above described. Carbon dioxide gas is now fed through the solution and simultaneously there is added to the starting solution a solution containing sodium, aluminum, fluorine and caustic alkali. Gassing of the starting solution with carbon dioxide is continued during and after the addition to this solution and is continued until the total bicarbonate content of the mixed solution is at least 20 grams per liter. The solution containing sodium, aluminum, fluorine, and alkali should be added as quickly as possible to the starting solution, preferably at a rate of about 60 cubic feet a minute, but this rate may be as high as 100 cubic feet per minute without substantially affecting the result. If these conditions are closely followed, the result will be, in most cases, the precipitation of the new product above described but, even under the best operating conditions, this product will not always be produced and there will be batches of precipitate produced which are of different average particle size and which, while not having the best dusting characteristics, may still be used for insecticidal purposes. As a specific example of the operation of this process, we will cite an example of the process in production. About 530 cubic feet of a solution containing about 35 grams per liter of sodium carbonate were placed in a tank and treated by passing carbon dioxide gas therethrough until the bicarbonate content of the solution was about 35 grams per liter. Thereafter, and while gassing of the starting solution continued, there was added to the tank at the rate of about 60 cubic feet per minute 2700 cubic feet of a caustic solution containing 10 grams per liter of fluorine ($F_2$), 4.5 grams per liter of alumina. After the addition of this solution, gassing with carbon dioxide was continued until the bicarbonate content of the total solution rose to 25 grams per liter. During this treatment a finely divided free-flowing sodium aluminum fluoride was precipitated. This fluoride was filtered from the solution in a filter press, dried and treated to eliminate agglomerates. Measurements showed that the resultant powder mass had an average particle size of 2.8 microns, that 69.6 per cent. of its particles were 0 to 5 microns in size, that 28.3 per cent. of its particles were 5 to 10 microns in size, that 0.1 per cent. of its particles were 10 to 20 microns in size, that 0.1 per cent. of its particles were 20 to 40 microns in size and that 1.9 per cent. of its particles were plus 40 microns in size. After the removal of the precipitate, 530 cubic feet of the mother liquor, from which the precipitate was removed, were returned to the process and were there treated with carbon dioxide gas to form the starting solution for the production of the next batch of the precipitate.

The solution which is added to the starting solution in this process may be made in any convenient manner. Preferably it should always contain 9 to 12 grams of fluorine per liter or more and its alumina content should range between 2 and 4 grams per liter. An excess of alumina above that required to form the compound $Na_3AlF_6$ may be used, but if the final sodium fluoride precipitate is to contain a minimum amount of excess aluminum hydrate, simple trial will determine how much excess alumina can be tolerated in this solution without inducing a precipitation of more aluminum hydrate in the final product than is desired.

Having thus described our invention, we claim:

1. A free flowing, non-pelleting, dustible insecticide powder composed of sodium aluminum fluoride in originally precipitated form without further reduction in size, 90 per cent. of the particles of which are in size not greater than 10 microns and which have an average particle size between 2.5 and 4.5 microns.

2. A free flowing, non-pelleting, dustible insecticide powder composed of sodium aluminum fluoride in originally precipitated form without further reduction in size, 95 per cent. of the particles of which are in size not greater than 10 microns and which have an average particle size between 2.5 and 4.5 microns.

3. The method of precipitating from an alkaline solution containing sodium, aluminum and fluorine values, sodium aluminum fluoride in the form of a precipitate, 90 per cent. of the particles of which are 10 microns or less in size, and having an average particle size of 2.5 to 5.0 microns, which comprises forming a suspension of sodium aluminum fluoride seed particles of a size between 1 to 2 microns in said solution and thereafter neutralizing said solution, said process being further characterized by the fact that the ratio of the total weight of said seed particles to the total weight of soluble fluorine in the solution is not less than about 0.45 nor greater than 0.87.

4. The method of producing sodium aluminum fluoride in the form of particles having an average particle size of from 2.5 to 5 microns, at least 90 per cent. of said particles being 10 microns or less in size, which comprises forming a suspension of sodium aluminum fluoride seed particles of a size of from 1 to 2 microns in a solution containing sodium, aluminum, and fluorine values, and thereafter precipitating sodium aluminum fluoride on said seed particles, the ratio of the total weight of said seed particles to the total weight of the fluorine precipitated in said precipitation operation being not less than 0.45 nor greater than 0.87.

5. The method of producing sodium aluminum fluoride in the form of particles having an average particle size of from 2.5 to 5 microns, at least 90 per cent. of said particles being 10 microns or less in size, which comprises forming a suspension of sodium aluminum fluoride seed particles of a size of from 1 to 2 microns in an alkaline solution containing sodium, aluminum, and fluorine values, the ratio of the total weight of seed particles to the total weight of soluble fluorine in the solution being not less than 0.45 nor greater than 0.87, and thereafter neutralizing said solution.

6. The method of producing sodium aluminum fluoride in the form of particles having an average particle size of from 2.5 to 5 microns, at least 90 per cent. of said particles being 10 microns or less in size, which comprises forming a suspension of sodium aluminum fluoride seed particles of a size of from 1 to 2 microns in a solution containing sodium, aluminum, and fluorine values, and thereafter precipitating sodium aluminum fluoride on said seed particles, the ratio of the total weight of said seed particles to the total weight of the fluorine precipitated in said precipitation operation being not less than about 0.6 nor greater than 0.75.

7. The method of producing sodium aluminum fluoride in the form of particles having an average particle size of from 2.5 to 5 microns, at least 90 per cent. of said particles being 10 microns or less in size, which comprises forming a suspension of sodium aluminum fluoride seed particles of a size of from 1 to 2 microns in a solution containing sodium, aluminum, and fluorine values, and thereafter precipitating sodium aluminum fluoride on said seed particles, the ratio of the total weight of said seed particles to the total weight of the fluorine precipitated in said precipitation operation being about 0.675.

8. The process of claim 4 characterized by the fact that the seed particles are added to the solution.

9. The process of claim 4 characterized by the fact that the seed particles are formed in the solution by precipitation prior to final neutralization.

10. A free flowing, non-pelleting, dustible insecticide powder composed of sodium aluminum fluoride in originally precipitated form without further reduction in size, 90 per cent. of the particles of which are in size not greater than 10 microns and which have an average particle size between 2.5 and 4.5 microns, said sodium aluminum fluoride being the product of neutralization in the presence of sodium aluminum fluoride seed particles of a size between one to two microns, of an alkaline solution containing sodium aluminum and fluorine values under conditions where the ratio of the total weight of the said seed particles to the total weight of the sodium in the solution is not less than about 0.45 nor greater than 0.87.

DANIEL C. McLEAN.
JOHN E. MORROW.
JACOB R. FOX.

REFERENCES CITED

The following references are of record in the file of this patent:

UNITED STATES PATENTS

| Number | Name | Date |
|---|---|---|
| 1,871,723 | Morrow | Aug. 16, 1932 |
| 2,196,077 | Morrow | Apr. 2, 1940 |
| 2,210,594 | Morrow | Aug. 6, 1940 |
| 2,357,987 | Winding | Sept. 12, 1944 |

Certificate of Correction

Patent No. 2,492,650                                              December 27, 1949

DANIEL C. McLEAN ET AL.

It is hereby certified that error appears in the printed specification of the above numbered patent requiring correction as follows:

Column 7, line 51, before the word "fluoride" insert *aluminum*;

and that the said Letters Patent should be read with this correction therein that the same may conform to the record of the case in the Patent Office.

Signed and sealed this 16th day of May, A. D. 1950.

[SEAL]

THOMAS F. MURPHY,
*Assistant Commissioner of Patents.*